(12) United States Patent
Ohletz et al.

(10) Patent No.: US 8,511,697 B2
(45) Date of Patent: Aug. 20, 2013

(54) ARRANGEMENT OF A STABILIZER ON A WHEEL SUSPENSION FOR MOTOR VEHICLES

(75) Inventors: Armin Ohletz, Kösching (DE); Walter Schmidt, Rennertshofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/145,848

(22) PCT Filed: Dec. 23, 2009

(86) PCT No.: PCT/EP2009/009235
§ 371 (c)(1),
(2), (4) Date: Jul. 22, 2011

(87) PCT Pub. No.: WO2010/083874
PCT Pub. Date: Jul. 29, 2010

(65) Prior Publication Data
US 2011/0278811 A1    Nov. 17, 2011

(30) Foreign Application Priority Data

Jan. 23, 2009 (DE) .................. 10 2009 005 898

(51) Int. Cl.
*B60G 21/055* (2006.01)

(52) U.S. Cl.
USPC ......... 280/124.13; 280/124.106; 280/124.137

(58) Field of Classification Search
USPC ................. 280/124.106, 124.13, 124.137
See application file for complete search history.

(56) References Cited

U.S. PATENT DOCUMENTS

| 2,480,934 | A | * | 9/1949 | Julien | 267/284 |
| 4,050,710 | A | * | 9/1977 | Flaig | 280/6.16 |
| 5,263,736 | A | * | 11/1993 | Stevens | 280/6.157 |
| 5,839,741 | A | * | 11/1998 | Heyring | 280/124.106 |
| 6,554,305 | B2 | * | 4/2003 | Fulks | 280/124.107 |
| 6,951,341 | B1 | * | 10/2005 | Beetz et al. | 280/5.511 |
| 7,500,686 | B2 | * | 3/2009 | Munster | 280/124.107 |
| 7,651,106 | B2 | * | 1/2010 | Vortmeyer | 280/124.106 |
| 7,726,666 | B2 | * | 6/2010 | Grannemann et al. | 280/5.511 |
| 7,766,344 | B2 | | 8/2010 | Buma | |
| 2005/0167932 | A1 | | 8/2005 | Munster | |

FOREIGN PATENT DOCUMENTS

| CN | 101088787 | 12/2007 |
| DE | 199 36 541 C2 | 2/2001 |
| DE | 101 26 928 A1 | 12/2002 |
| DE | 102 42 552 | 3/2004 |
| DE | 10 2004 002550 | 8/2005 |

(Continued)

*Primary Examiner* — Paul N Dickson
*Assistant Examiner* — Timothy Wilhelm
(74) *Attorney, Agent, or Firm* — Henry M. Feiereisen LLC

(57) ABSTRACT

The invention relates to an arrangement of a stabilizer (26), which is configured in two parts, on a wheel suspension for a motor vehicle, comprising torsion bars (26b) which are separated from each other and are each articulated on wheel suspension elements (16) by means of an output lever (26a) and can be co-rotated in the same or opposite direction by means of associated actuating devices (30), wherein each torsion bar (26b) is extended with a hollow shaft (26e) which encompasses the torsion bar (26b) in order to increase the effective torsion length, the output lever (26a) being formed on the hollow shaft. According to the invention, the torsion bar (26b) is mounted in a fixed bearing (59) in the actuating device (30) and in an axial loose bearing (26d) in the hollow shaft (26e).

9 Claims, 3 Drawing Sheets

(56) References Cited

FOREIGN PATENT DOCUMENTS

| | | |
|---|---|---|
| DE | 10 2006 045 490 | 4/2008 |
| DE | 10 2007 007 214 | 8/2008 |
| EP | 1 867 503 A1 | 12/2007 |
| EP | 1 958 804 A1 | 8/2008 |
| JP | 59 013145 A | 1/1984 |
| JP | 08-085328 | 4/1996 |
| JP | 2004 314947 | 11/2004 |
| JP | 2006 082751 | 3/2006 |
| JP | 2008 302731 | 12/2008 |

* cited by examiner

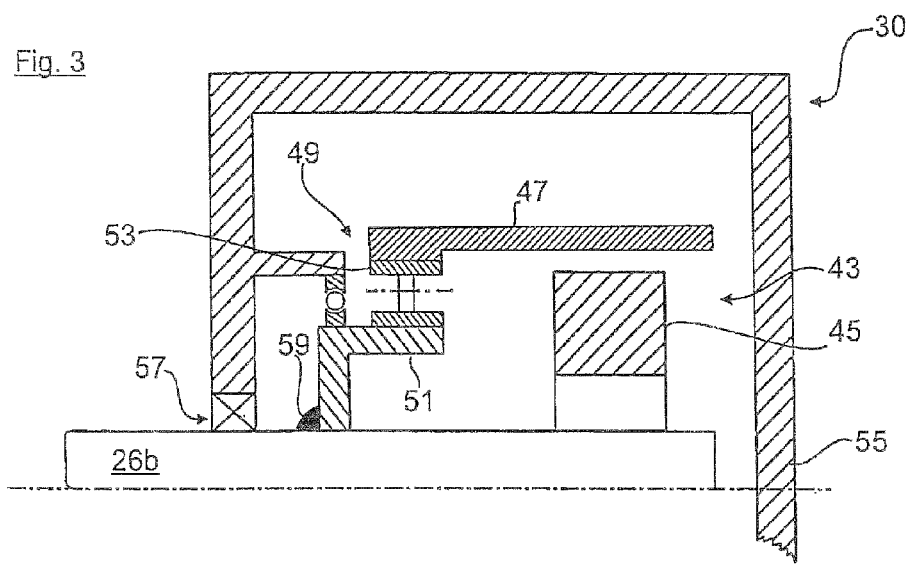
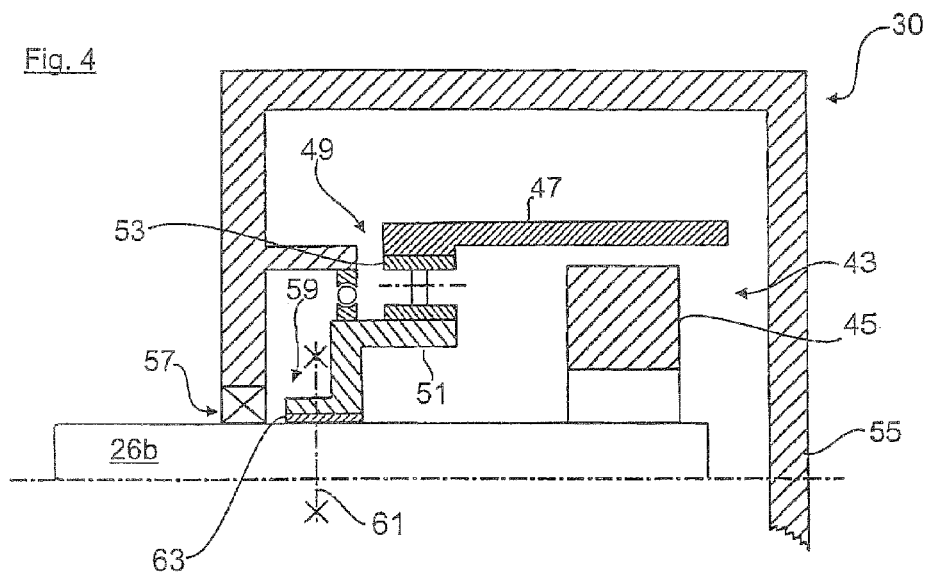

ARRANGEMENT OF A STABILIZER ON A WHEEL SUSPENSION FOR MOTOR VEHICLES

CROSS-REFERENCES TO RELATED APPLICATIONS

This application is the U.S. National Stage of International Application No. PCT/EP2009/009235, filed Dec. 23, 2009, which designated the United States and has been published as International Publication No. WO 2010/083874 and which claims the priority of German Patent Application, Serial No. 10 2009 005 898.2, filed Jan. 23, 2009, pursuant to 35 U.S.C. 119(a)-(d).

BACKGROUND OF THE INVENTION

The invention relates to an arrangement of a stabilizer on a wheel suspension for motor vehicles.

For example, DE 101 26 928 A1, DE 10 2004 002 550 A1 or DE 102 42 552 B4 disclose generic arrangements of two-part stabilizers with an actuating device for affecting the spring rates and the driving characteristics of motor vehicles. The roll behavior and banking of the motor vehicle can be reduced by adjusting the split torsion bars of the overall U-shaped stabilizer in opposite directions, or the tendency to slant, for example during braking, can be compensated through adjustment in the same direction.

DE 10 2007 007 214 A1 discloses an arrangement of a two-part stabilizer on a wheel suspension for a motor vehicle. This stabilizer has separate torsion bars which are each attached via a respective output lever on the wheel suspension elements and which are rotated in the same direction or in opposite directions with respectively associated actuating devices. To increase its effective torsion length, each torsion bar is extended by a hollow shaft encompassing the torsion bar, with the output lever being formed on the hollow shaft. The torsion bar is therefore in driving connection with the coaxially arranged hollow return shaft. The stabilizer is, on one hand, exposed to thermal stress when the vehicle is in operation which may impair its functionality. On the other hand, the stabilizer is difficult to remove from the vehicle during service.

It is therefore the object of the invention to provide an arrangement of a two-part stabilizer on a wheel suspension for a motor vehicle, which is able to withstand thermal stress and which can be easily serviced and repaired.

SUMMARY OF THE INVENTION

According to an aspect of the invention, a two-part stabilizer arranged on a wheel suspension of a motor vehicle includes separately implemented torsion bars which are each articulated on the wheel suspension elements by an associated output lever and which can be rotated with respect to one another in the same direction or in opposite directions by way of respectively associated actuating devices, wherein to enlarge its effective torsion length, each torsion bar is extended with a hollow shaft encompassing the torsion bar, with the output lever being formed on the hollow shaft, wherein the torsion bar is supported in the actuating device in a fixed bearing and is supported in the hollow shaft in an axial loose bearing In this way, in the event of thermal stress and torsional load, the axial length of the torsion bar can thus be compensated. At the same time, the combination according to the invention of a loose bearing and a fixed bearing of the respective torsion bars takes into account that the components of the stabilizer have associated tolerances which can be compensated by the loose bearing, thereby facilitating a reliable installation of the stabilizer.

A cost-effective fixed bearing is attained when the torsion bar is welded to a drive element of the actuating device. Conversely, for forming the loose bearing, the other end of the torsion bar can be connected with the hollow shaft for axial displacement and in fixed rotative engagement. For this purpose, a spline has proven to be advantageous for transmitting high torques with simultaneous length compensation.

As an alternative to the aforementioned weld connection, the fixed bearing between the torsion bar and the drive element of the actuating device can be attained with a releasable connection. In this case, the torsion bar can be supported for axial displacement in the drive element and can be secured in the axial direction via the additional releasable connection, for example a screw connection. In this embodiment, the torsion bar is therefore supported by two loose bearings, of which one of the two loose bearings is additionally transformed into a fixed bearing by the releasable connection.

If a torsion bar breaks, then there is no longer a need to replace the entire stabilizer unit, but only the broken torsion bar. With a fixed bearing formed in this way, the support of the torsion bar as a whole is statically defined in the absence of stress due to temperature or torsion.

To provide a stable abutment for bending moments, each of the torsion bars may be supported for rotation in a bearing location of the superstructure, in particular in the region of the output lever. Each of the torsion bars can be extended beyond the bearing location with a projecting length, thereby enlarging its effective torsion length. To make use of the entire installation space available in the transverse direction of the vehicle, each torsion bar may have a projecting length that corresponds to the distance between the bearing location and the vehicle wheel in its neutral position minus a required movement clearance of the vehicle wheel. In this way, the vehicle wheel is prevented from making contact with the torsion bar when the toe angle/camber angle changes.

BRIEF DESCRIPTION OF THE DRAWING

An exemplary embodiment of the invention will now be described in more detail. It is shown in:

FIG. 3 a basic illustration of an actuating device of one of the torsion bars of the stabilizer; and FIG. 4 a view corresponding to FIG. 3 of a modified actuating device.

DETAILED DESCRIPTION OF PREFERRED EMBODIMENTS

Figure 1:
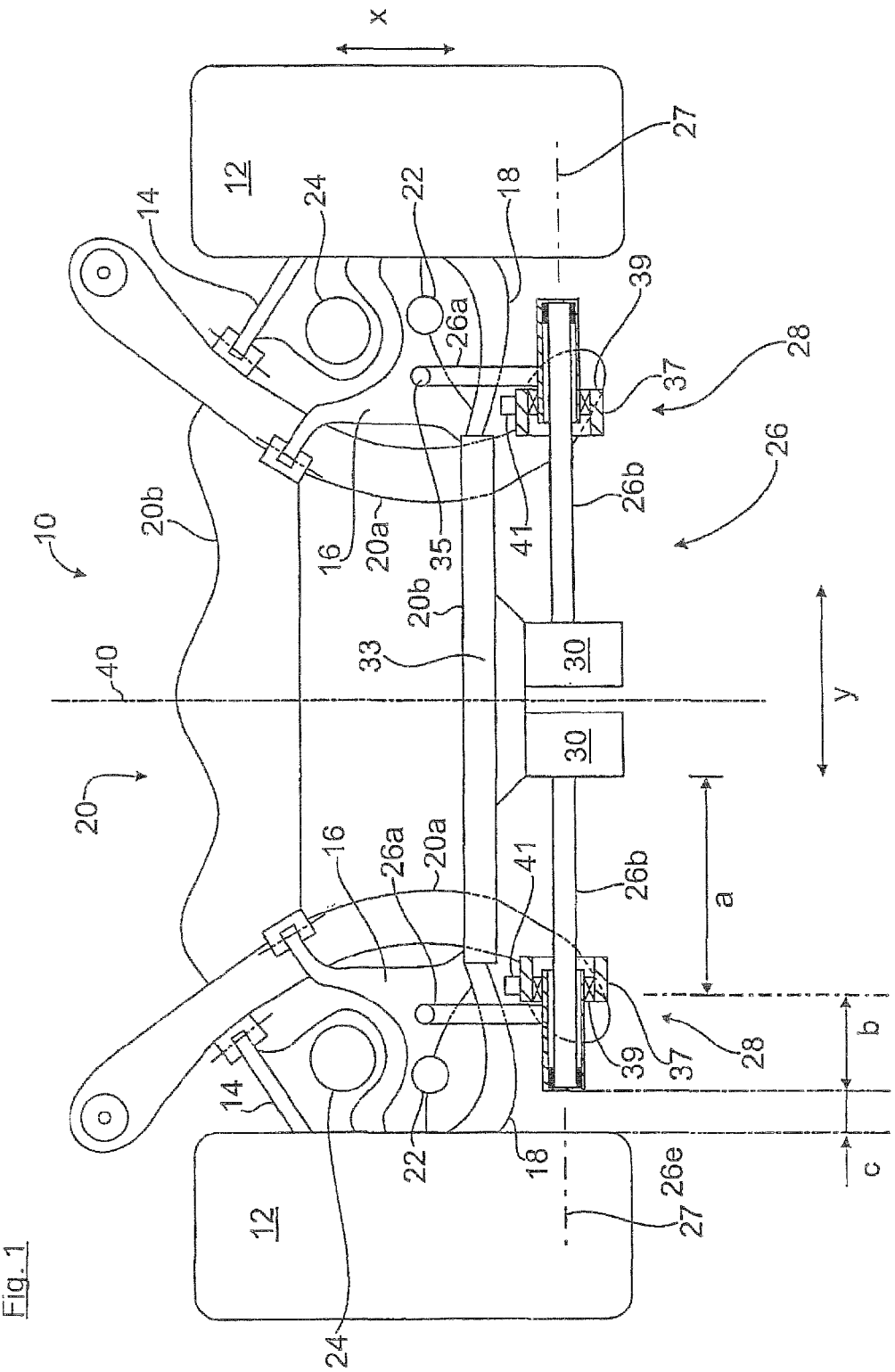
FIG. 1 a top view upon a rear wheel suspension for motor vehicles, with an auxiliary frame, wheel-guiding suspension arms, a two-part stabilizer and two electromechanical actuating devices acting on the transverse torsion bars of the stabilizer.

FIG. 1 shows in a simplified schematic diagram a rear wheel suspension 10 for the rear wheels 12 of a motor vehicle, wherein the wheel-guiding suspension arms 14, 16, 18, not shown in greater detail, are swingably mounted on the side of the wheel to a wheel carrier (not shown) and swingably mounted on the side of the superstructure to an auxiliary frame 20. The auxiliary frame 20 has, as shown, two side rails 20a and two crossbeams 20b and is mounted in a manner not shown on the superstructure of the motor vehicle by way of damping bearings.

In addition, a shock absorber 22 and a bearing spring 24 are arranged on each side in a conventional manner between the suspension arms 14, 18 and the superstructure of the motor vehicle. In a modified form, the wheel suspension 10 may also be designed as a wheel suspension for the steered front wheels of a motor vehicle.

Furthermore, according to FIG. 1, a substantially U-shaped two-part stabilizer 26 is supported for rotation on the wheel suspension 10 by way of bearing locations 28 and has an output lever 26a which substantially extends in the longitudinal direction of the vehicle and is articulated on the lower suspension arm 16 of the wheel suspension 10.

The effect of the two-part stabilizer 26 on the suspension arms 16 can be adjusted by way of two electromechanical actuating devices 30 which each include an electric motor and a self-locking reduction gear.

Figure 2:
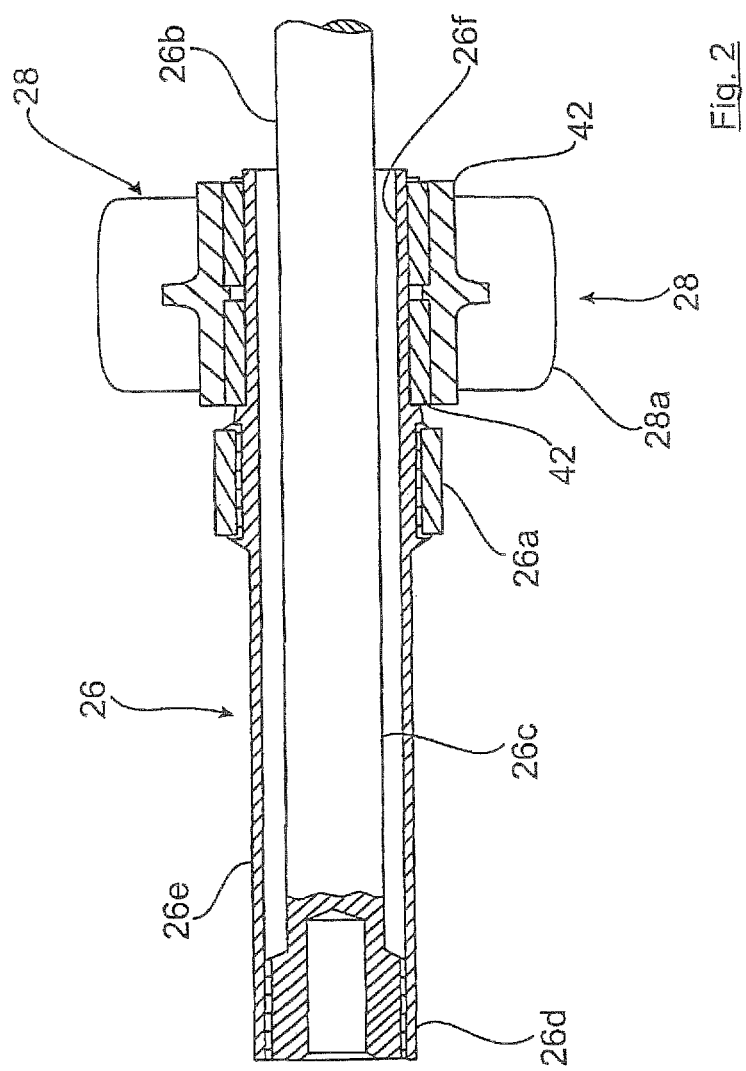
FIG. 2 a longitudinal cross-section through one of the stabilizer bearings with extended torsion bar and a returning hollow shaft.

The two-part stabilizer 26 is composed, as illustrated in FIGS. 1 and 2, as follows:

Each substantially transverse torsion bar 26b extends from the output levers 26a across the vertical longitudinal vehicle center plane (dash-dotted line 40) to the associated actuating device 30 with which the torsion bar 26b is drivingly connected and in fixed rotative engagement by way of a spline (not shown) for example.

The rotation axes 27 of the torsion bars 26b are aligned in FIG. 1 in coaxial relationship. In a technical implementation, the two axes 27 can also cross each other or can form a slightly upwardly pointing arrow. The torsion bars 26b together with their output levers 26a are constructed symmetrically such that the torsion bars 26b can be installed as identical parts on the left side or the right side of the wheel suspension 10.

As shown in FIG. 1, the two bearing positions 28 are spaced from the actuating devices 30 by a bearing distance a. The two actuating devices 30 are arranged in a common housing 31 which is mounted by way of a bracket 33 on the rear crossbeam 20b of the auxiliary frame 20.

The bearing locations 28 which are spaced from the actuating devices 30 are arranged directly next to the output levers 26a, i.e., are arranged in the transverse vehicle direction y proximate to the force introduction points 35 on the suspension arms 16, thereby reducing the bending moments operating on the bearing locations 28. Both the bearing locations 28 and the actuating device housing 31 are mounted directly on the rear crossbeam 20b of the auxiliary frame 20.

One section 26c of each torsion bar 26b (see FIG. 2) is extended without restraint through the bearing location 28 and beyond the attachment location of the output lever 26a by a defined length, wherein an end of each torsion bar 26b is connected in fixed rotative engagement by way of a spline 26d to a hollow shaft 26e which, as shown, supports the longitudinal arm 26a. The torsion moment of the torsion bar 26b, 26c applied to the longitudinal arm 26a is then returned via the spline 26d and of the hollow shaft 26e.

According to FIG. 2, the hollow shaft 26e is supported for rotation in the bearing location 28, which is formed by the bearing shells 28a and fixed to the superstructure, by a formed-on bearing neck 26f and via two needle bearings 42, and hence forms the guide for both the hollow shaft 26e and the torsion bar 26b, 26c in the transition region to the longitudinal arm 26a attached on the hollow shaft 26e.

As also shown in FIG. 1, bearing brackets 37 are formed on the side rails 20a of the auxiliary frame 20 at both bearing locations 28 for the torsion bars 26b. These bearing brackets 37 respectively support the support bearings 39 for rotational support of the torsion bars 26b. Spring excursion sensors 41 which measure a rotational movement of the output lever 26a are arranged on the outside of the bearing brackets 37 and determine a rotation movement of the output levers 26a. The spring deflection movement of the vehicle can be determined from the respectively measured rotation angle with a not shown control device.

FIG. 3 shows in a simplified schematic diagram in a half cross-sectional view the left actuating device 30 according to FIG. 1. The actuating device 30 has an electric motor 43 with a stator 45 which is guided around the end of the torsion bar 26b without making contact. Associated to the stator 45 radially outwards is a hollow shaft rotor 47 which drives via a gear stage 49 a cup-shaped drive wheel 51 that is supported by the torsion bar 26b. The rotation axes of the rotor 47, the drive wheel 51 and the torsion bar 26b are coaxially arranged with respect to one another. For a driving connection of the rotor 47 with the cup-shaped drive wheel 51, the gear stage 49 has an intermediate tooth gear 53 which is in toothed engagement with both the rotor 47 and the drive wheel 51. The gear stage 49 together with the electric motor 43 is arranged in a housing 55 of the actuating device 30. The torsion bar 26b exits the housing 55 through a bearing opening 57.

According to FIG. 3, the cup-shaped drive wheel 51 is supported in a fixed bearing 59 on the torsion bar 26b. The fixed bearing 59 is realized in FIG. 3 as a non-detachable weld joint. Alternatively, according to FIG. 4, the cup-shaped drive wheel 51 is releasably connected with the torsion bar 26b by a screw connection 61. To this end, the drive wheel 51 is formed with a hub section 63 that is coaxial with the torsion bar 26b and screwed together with the torsion bar 26b. In contrast to FIG. 3, the screw connection 61 can be released when the torsion bar breaks, so that the torsion bar 26b can be readily withdrawn by pulling it out of the housing 55, without necessitating an exchange of also the gear stage 49 and the electric motor 43 of the actuating device 30.

As also shown in FIG. 1, the torsion bar 26d protrudes with a projecting length b in the transverse vehicle direction y beyond the respective bearing location 28. The projecting length b of the torsion bar 26b is sized so as to use the entire installation space between the bearing location 28 and the vehicle wheel 12 minus a required movement clearance c necessary for adjustment of the toe angle/camber angle. The effective spring deflection length of the torsion bar 26d is therefore maximally extended in the transverse vehicle direction y.

The invention claimed is:

1. A two-part stabilizer for arrangement on a wheel suspension for a motor vehicle, said stabilizer comprising:
    separate torsion bars;
    output levers coupling the torsion bars to wheel suspension elements in one-to-one-correspondence;
    actuating devices operably connected to the torsion bars in one-to-one-correspondence for rotating the torsion bars in a same direction or in opposite directions; and
    hollow shafts supporting the output levers and placed respectively in surrounding relationship to the torsion bars to extend an effective length of the torsion bars,
    wherein each torsion bar is supported in the actuating device in a fixed bearing and supported in the hollow shaft in an axial loose bearing,
    wherein each actuating device includes a drive element, said fixed bearing being realized between the torsion bar and the drive element by axially movably supporting the torsion bar in fixed rotative engagement in the drive element of the actuating device and by detachably securing the torsion bar in axial direction in the drive element of the actuating device via a releasable connection implemented as a screw connection.

2. The stabilizer of claim 1, wherein the torsion bar and the hollow shaft are connected to one another in the axial loose bearing for axial displacement and in fixed rotative engagement.

3. The stabilizer of claim 1, wherein the axial loose bearing is configured as a tooth system.

4. The stabilizer of claim 1, wherein the axial loose bearing is configured as a spline.

5. The stabilizer of claim 1, wherein the fixed bearing includes a tooth system between the torsion bar and the drive element for axially movable support of the torsion bar in fixed rotative engagement in the drive element of the actuating device.

6. The stabilizer of claim 1, further comprising a further bearing for rotatably supporting the torsion bar.

7. The stabilizer of claim 6, wherein the further bearing is located in an area of the output lever.

8. The stabilizer of claim 6, wherein the torsion bar is sized to extend beyond the further bearing by a projecting length.

9. The stabilizer of claim 8, wherein the projecting length of the torsion bar corresponds to a distance between the third bearing and a vehicle wheel in its neutral position minus a required movement clearance of the vehicle wheel.

* * * * *